United States Patent
Yamamoto (10) Patent No.: US 6,353,504 B1
(45) Date of Patent: Mar. 5, 2002

(54) OBJECTIVE LENS FOR ENDOSCOPE

(75) Inventor: Chikara Yamamoto, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 21 days.

(21) Appl. No.: 09/661,409

(22) Filed: Sep. 13, 2000

(30) Foreign Application Priority Data

Sep. 20, 1999 (JP) .......................................... 11-266242

(51) Int. Cl.$^7$ ............................................. G02B 15/14
(52) U.S. Cl. ..................... 359/686; 359/656; 359/684
(58) Field of Search .................. 359/686, 683–684, 359/676, 656–660

(56) References Cited

U.S. PATENT DOCUMENTS 5,781,350 A * 7/1998 Tachihara et al. ........... 359/782
5,936,778 A * 8/1999 Miyano et al. ............. 359/660
6,160,699 A * 12/2000 Nagaoka .................... 359/686

FOREIGN PATENT DOCUMENTS

JP         2876252       1/1999

OTHER PUBLICATIONS

JPanese Patent Office, "Patent Abstracts of Japan", Publication No.: 04218012 A, Date of Publication: Aug. 7, 1992, Application No.: 02276200, Date of Filing: Oct. 17, 1900.

* cited by examiner

*Primary Examiner*—Jordan M. Schwartz
(74) *Attorney, Agent, or Firm*—Snider & Associates; Ronald R. Snider (57) ABSTRACT

An objective lens for endoscope comprises, successively from an object side, a first lens group having a negative refracting power, a second lens group having a positive refracting power, a third lens group having a negative refracting power, and a fourth lens group having a positive refracting power; wherein the third lens group and one of the second and fourth lens groups are movable along an optical axis. The objective lens further satisfies the following conditional expressions:

$$2.0 < \beta_{1T}/\beta_{1W} < 10.0$$

$$1.2 < f_T/f_W$$

where

$\beta_{1T}$ is the magnification of the first lens group at the telephoto end;

$\beta_{1W}$ is the magnification of the first lens group at the wide end;

$f_T$ is the focal length of the whole lens at the telephoto end; and $f_W$ is the focal length of the whole lens at the wide end.

9 Claims, 10 Drawing Sheets

FIG. 1A EXAMPLE 1 WIDE END

FIG. 1B TELEPHOTO END

FIG. 6A
EXAMPLE 1
WIDE END
F/9.75

— d-LINE
---- F-LINE
---- C-LINE

SPHERICAL
ABERRATION

FIG. 6B
EXAMPLE 1
WIDE END
$\omega = 59.2°$

— SAGITTAL
---- TANGENTIAL

ASTIGMATISM

FIG. 6C
EXAMPLE 1
WIDE END
$\omega = 59.2°$

DISTORTION

FIG. 6D
EXAMPLE 1
WIDE END
$\omega = 59.2°$

---- F-LINE
---- C-LINE

CHROMATIC
ABERRATION IN
MAGNIFICATION

FIG. 6E
EXAMPLE 1
TELEPHOTO END
F/10.81

— d-LINE
---- F-LINE
---- C-LINE

SPHERICAL
ABERRATION

FIG. 6F
EXAMPLE 1
TELEPHOTO END
$\omega = 24.5°$

— SAGITTAL
---- TANGENTIAL

ASTIGMATISM

FIG. 6G
EXAMPLE 1
TELEPHOTO END
$\omega = 24.5°$

DISTORTION

FIG. 6H
EXAMPLE 1
TELEPHOTO END
$\omega = 24.5°$

---- F-LINE
---- C-LINE

CHROMATIC
ABERRATION IN
MAGNIFICATION

FIG.7A EXAMPLE 2 WIDE END F/7.94 SPHERICAL ABERRATION

FIG.7B EXAMPLE 2 WIDE END ω=58.6° ASTIGMATISM

FIG.7C EXAMPLE 2 WIDE END ω=58.6° DISTORTION

FIG.7D EXAMPLE 2 WIDE END ω=58.6° CHROMATIC ABERRATION IN MAGNIFICATION

FIG.7E EXAMPLE 2 TELEPHOTO END F/12.17 SPHERICAL ABERRATION

FIG.7F EXAMPLE 2 TELEPHOTO END ω=25.3° ASTIGMATISM

FIG.7G EXAMPLE 2 TELEPHOTO END ω=25.3° DISTORTION

FIG.7H EXAMPLE 2 TELEPHOTO END ω=25.3° CHROMATIC ABERRATION IN MAGNIFICATION

FIG.8A
EXAMPLE 3
WIDE END
F/7.98 d-LINE
F-LINE
C-LINE

SPHERICAL
ABERRATION

FIG.8B
EXAMPLE 3
WIDE END
$\omega = 59.2°$

SAGITTAL
TANGENTIAL

ASTIGMATISM

FIG.8C
EXAMPLE 3
WIDE END
$\omega = 59.2°$

DISTORTION

FIG.8D
EXAMPLE 3
WIDE END
$\omega = 59.2°$

F-LINE
C-LINE

CHROMATIC
ABERRATION IN
MAGNIFICATION

FIG.8E
EXAMPLE 3
TELEPHOTO END
F/10.01 d-LINE
F-LINE
C-LINE

SPHERICAL
ABERRATION

FIG.8F
EXAMPLE 3
TELEPHOTO END
$\omega = 23.6°$

SAGITTAL
TANGENTIAL

ASTIGMATISM

FIG.8G
EXAMPLE 3
TELEPHOTO END
$\omega = 23.6°$

DISTORTION

FIG.8H
EXAMPLE 3
TELEPHOTO END
$\omega = 23.6°$

F-LINE
C-LINE

CHROMATIC
ABERRATION IN
MAGNIFICATION

FIG.9A
EXAMPLE 4
WIDE END
F/7.95

FIG.9B
EXAMPLE 4
WIDE END
ω=59.1°

FIG.9C
EXAMPLE 4
WIDE END
ω=59.1°

FIG.9D
EXAMPLE 4
WIDE END
ω=59.1°

FIG.9E
EXAMPLE 4
TELEPHOTO END
F/10.08

FIG.9F
EXAMPLE 4
TELEPHOTO END
ω=24.9°

FIG.9G
EXAMPLE 4
TELEPHOTO END
ω=24.9°

FIG.9H
EXAMPLE 4
TELEPHOTO END
ω=24.9°

FIG. 10A
EXAMPLE 5
WIDE END
F/7.97

— d-LINE
---- F-LINE
—··— C-LINE

-0.1    0.1
SPHERICAL
ABERRATION

FIG. 10B
EXAMPLE 5
WIDE END
$\omega = 58.8°$

—— SAGITTAL
---- TANGENTIAL

-0.1    0.1
ASTIGMATISM

FIG. 10C
EXAMPLE 5
WIDE END
$\omega = 58.8°$

-50%    50%
DISTORTION

FIG. 10D
EXAMPLE 5
WIDE END
$\omega = 58.8°$

---- F-LINE
—··— C-LINE

-0.02    0.02
CHROMATIC
ABERRATION IN
MAGNIFICATION

FIG. 10E
EXAMPLE 5
TELEPHOTO END
F/13.23

— d-LINE
---- F-LINE
—··— C-LINE

-0.1    0.1
SPHERICAL
ABERRATION

FIG. 10F
EXAMPLE 5
TELEPHOTO END
$\omega = 22.8°$

—— SAGITTAL
---- TANGENTIAL

-0.1    0.1
ASTIGMATISM

FIG. 10G
EXAMPLE 5
TELEPHOTO END
$\omega = 22.8°$

-50%    50%
DISTORTION

FIG. 10H
EXAMPLE 5
TELEPHOTO END
$\omega = 22.8°$

---- F-LINE
—··— C-LINE

-0.02    0.02
CHROMATIC
ABERRATION IN
MAGNIFICATION

OBJECTIVE LENS FOR ENDOSCOPE

RELATED APPLICATIONS

This application claims the priority of Japanese Patent Application No. 11-266242 filed on Sep. 20, 1999, which is incorporated herein by reference.

BACKGROUND OF THE INVENTION

1. Field of the Invention

The present invention relates to an objective lens attached to a tip portion of an endoscope; and, in particular, to an endoscope objective lens which can be used in normal viewing and close-up magnified viewing states.

2. Description of the Prior Art

For utilizing endoscopes mainly in the medical field, image transmission by use of solid-state imaging devices such as CCD and image guide fibers, and analysis and viewing of thus captured images have come into practice, whereby demands for viewing with a higher accuracy and more accurate analysis have been increasing in recent years. Therefore, as to objective lenses, it has been desired to develop an endoscope objective lens which can obtain favorable images over a wide viewing range.

When viewing an object such as a diseased part, it is preferable that not only overview but also detailed viewing of a part under magnification can be carried out. In response to such a demand, a lens with a great depth of field has conventionally been used in general so as to widen the viewing range between its far and close objects.

On the other hand, as an endoscope objective lens which is switchable between a normal viewing (wide) state suitable for overview and a close-up magnified viewing (telephoto) state suitable for partial viewing, one disclosed in Japanese Patent No. 2876252, for example, has been known. This endoscope objective lens comprises four groups consisting of negative, positive, negative, and positive lens groups successively from the object side, in which the third group is moved along the optical axis, whereby it can adjust its focusing onto an object to view at a position outside its depth of field. Depending on the position of this moving lens group, viewing can be carried out not only at both ends of the normal viewing (wide) state and close-up magnified viewing (telephoto) state, but also in the intermediate region therebetween.

Though this endoscope objective lens enables viewing from the normal viewing state to the close-up magnified viewing state, there is a limitation on the magnification in use of the objective lens in the intermediate region. Namely, though the objective lens is normally capable of taking any object distance ranging from the normal viewing state to magnified viewing state with respect to a given object to view, the magnification in use of the objective lens would be uniquely determined upon focusing onto this object distance by use of internal lens movement.

For carrying out viewing with a higher accuracy or more accurate analysis, there is a demand for an objective lens having a higher degree of freedom in its magnification in use even in the viewing state in the intermediate region between both ends.

SUMMARY OF THE INVENTION

In view of such circumstances, it is an object of the present invention to provide a compact endoscope objective lens which can arbitrarily change its magnification in use in an intermediate region between both ends of its normal viewing state and close-up magnified viewing state, while various kinds of aberration are favorably corrected therein.

The endoscope objective lens in accordance with the present invention comprises, successively from an object side, a first lens group having a negative refracting power, a second lens group having a positive refracting power, a third lens group having a negative refracting power, and a fourth lens group having a positive refracting power; wherein two lens groups consisting of the third lens group and one of the second and fourth lens groups are moved along an optical axis so as to change magnification and carry out focusing; the endoscope objective lens further satisfying the following conditional expressions (1) and (2):

$$2.0 < \beta_{1T}/\beta_{1W} < 10.0 \tag{1}$$

$$1.2 < f_T/f_W \tag{2}$$

where $\beta_{1T}$ is the magnification of the first lens group at the telephoto end;

$f_{1W}$ is the magnification of the first lens group at the wide end;

$f_T$ is the focal length of the whole lens at the telephoto end; and $f_W$ is the focal length of the whole lens at the wide end.

Preferably, in the endoscope objective lens in accordance with the present invention, two lens groups consisting of the second and third lens groups are moved along the optical axis so as to change magnification and carry out focusing; the endoscope objective lens further satisfying the following conditional expressions (3), (6), and (7):

$$0.1 < |d_2|/f_2 < 1.0 \tag{3}$$

$$0.7 < f_2/f_W < 4.0 \tag{6}$$

$$-3.0 < f_3/f_W < -0.5 \tag{7}$$

where $d_2$ is the moving distance of the second lens group from the wide end to the telephoto end;

$f_2$ is the focal length of the second lens group;

$f_3$ is the focal length of the third lens group; and $f_W$ is the focal length of the whole lens at the wide end.

Preferably, in the endoscope objective lens in accordance with the present invention, two lens groups consisting of the third and fourth lens groups are moved along the optical axis so as to change magnification and carry out focusing; the endoscope objective lens further satisfying the following conditional expressions (4), (7), and (8):

$$0.1 < |d_4|/f_4 < 0.8 \tag{4}$$

$$-3.0 < f_3/f_W < -0.5 \tag{7}$$

$$1.0 < f_4/f_W < 2.5 \tag{8}$$

where $d_4$ is the moving distance of the fourth lens group from the wide end to the telephoto end;

$f_3$ is the focal length of the third lens group;

$f_4$ is the focal length of the fourth lens group; and $f_W$ is the focal length of the whole lens at the wide end.

Preferably, in the endoscope objective lens in accordance with the present invention, a stop is disposed between the second and third lens groups; the endoscope objective lens further satisfying the following conditional expression (5):

$$0.4 < \beta_{3.4T}/\beta_{3.4W} < 2.5 \quad (5)$$

where $\beta_{3.4T}$ is the composite magnification of the third and fourth lens groups at the telephoto end; and $\beta_{3.4W}$ is the composite magnification of the third and fourth lens groups at the wide end.

DESCRIPTION OF THE PREFERRED EMBODIMENTS

In the following, endoscope objective lenses in accordance with two embodiments of the present invention will be explained with reference to the drawings.

To begin with, the endoscope objective lens in accordance with the first embodiment will be explained with reference to FIGS. 1A and 1B. These drawings show a basic configuration of the lens in accordance with Example 1.

Figure 1A:
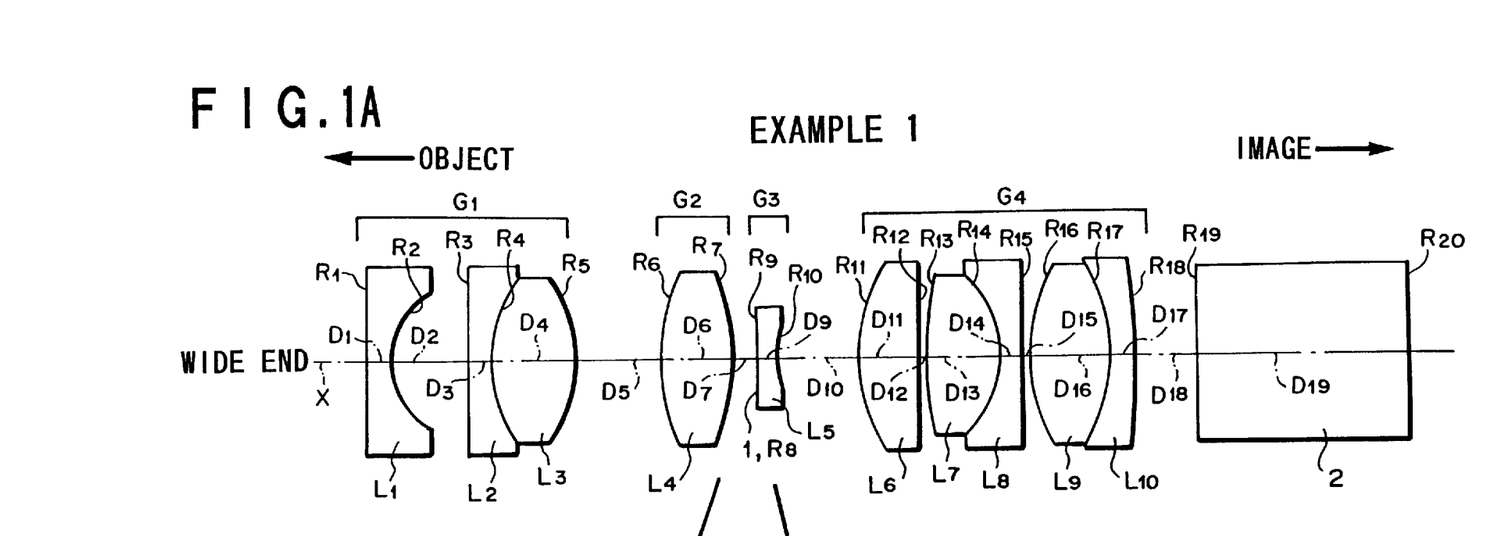
FIGS. 1A and 1B are views showing the configuration of the endoscope objective lens in accordance with Example 1 of the present invention.
Figure 1B:
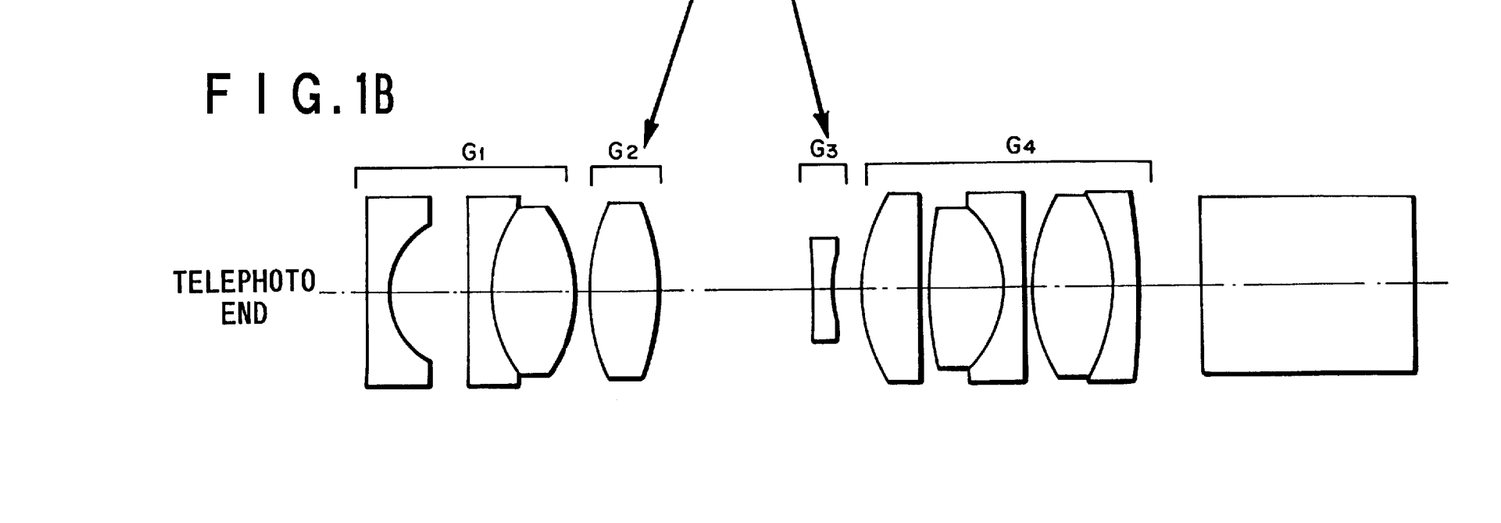

As shown in FIGS. 1A and 1B, this endoscope objective lens comprises, successively from the object side, a first lens group $G_1$ having a negative refracting power; a second lens group $G_2$, movable along the optical axis X, having a positive refracting power; a third lens group $G_3$, movable along the optical axis X, having a negative refracting power; and a fourth lens group $G_4$ having a positive refracting power.

As shown in FIGS. 1A and 1B, this endoscope objective lens is configured such that, from its normal viewing (wide) state to close-up magnified (telephoto) state, the second lens group $G_2$ moves toward the object along the optical axis, while the third lens group $G_3$ moves toward the image along the optical axis at the same time, so as to make it possible to change magnification and carry out focusing.

Here, the normal viewing (wide) state refers to a state having a longer object distance and a wider angle of view, thus being suitable for viewing over a wide area. On the other hand, the close-up magnified (telephoto) state refers to a state having a shorter object distance, thus being suitable for partly-enlarged viewing. The wide end shown in FIG. 1A refers to a state where the whole system attains its lowest magnification in the normal viewing state as the movable lens groups are moved to their predetermined positions. On the other hand, the telephoto end shown in FIG. 1B refers to a state where the whole system attains its highest magnification in the close-up magnified state as the movable lens groups are moved to their predetermined positions.

Further, in this objective lens, a stop 1 is disposed between the second lens group $G_2$ and the third lens group $G_3$; an optical path changing prism 2 is disposed on the image side from the fourth lens group $G_4$; and, though not depicted, a CCD device or image guide fiber is disposed on the image side from the prism 2, so that image information is transmitted thereto. In FIGS. 1A and 1B, the stop 1 is disposed so as be in contact with the surface of third lens group $G_3$ closest to the object on the optical axis.

Also, this objective lens is configured so as to satisfy the following conditional expressions (1) to (3) and (5) to (7):

$$2.0 < \beta_{1T}/\beta_{1W} < 10.0 \quad (1)$$

$$1.2 < f_T/f_W \quad (2)$$

$$0.1 < |d_2|f_2 < 1.0 \quad (3)$$

$$0.4 < \beta_{3.4T}/\beta_{3.4W} < 2.5 \quad (5)$$

$$0.7 < f_2/f_W < 4.0 \quad (6)$$

$$-3.0 < f_3/f_W < -0.5 \quad (7)$$

where $\beta_{1T}$ is the magnification of the first lens group $G_1$ at the telephoto end;

$\beta_{1W}$ is the magnification of the first lens group $G_1$ at the wide end;

$f_T$ is the focal length of the whole lens at the telephoto end;

$f_W$ is the focal length of the whole lens at the wide end;

$d_2$ is the moving distance of the second lens group $G_2$ from the wide end to the telephoto end;

$f_2$ is the focal length of the second lens group $G_2$;

$f_3$ is the focal length of the third lens group $G_3$;

$\beta_{3.4T}$ is the composite magnification of the third lens group $G_3$ and fourth lens group $G_4$ at the telephoto end; and $\beta_{3.4W}$ is the composite magnification of the third lens group $G_3$ and fourth lens group $G_4$ at the wide end.

Next, the endoscope objective lens in accordance with the second embodiment will be explained with reference to FIGS. 5A and 5B. These drawings show a basic configuration of the lens in accordance with Example 5.

Figure 5A:
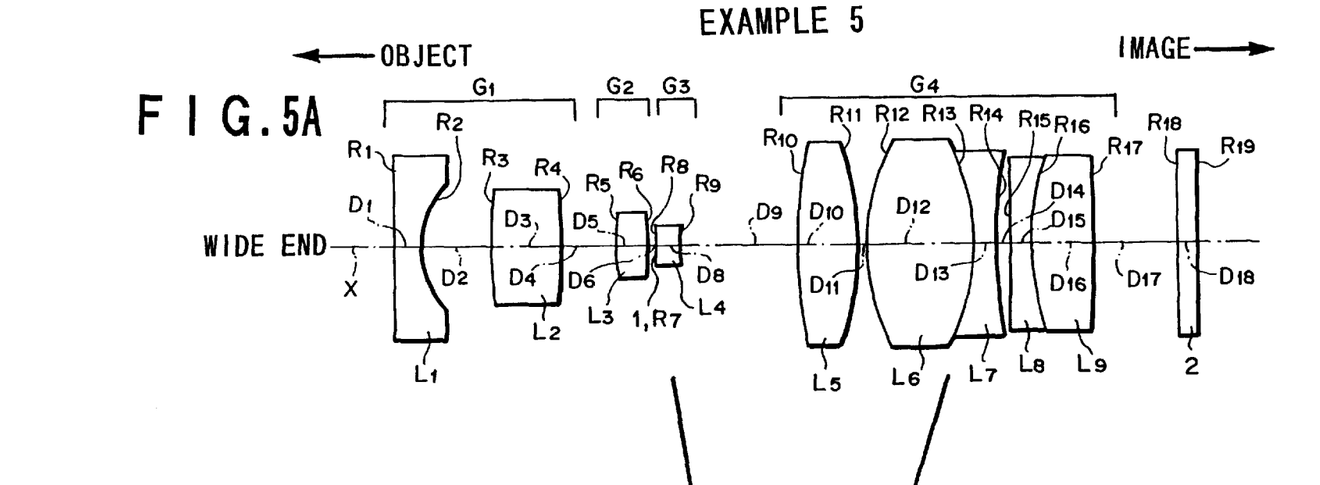
FIGS. 5A and 5B are views showing the configuration of the endoscope objective lens in accordance with Example 5 of the present invention.
Figure 5B:
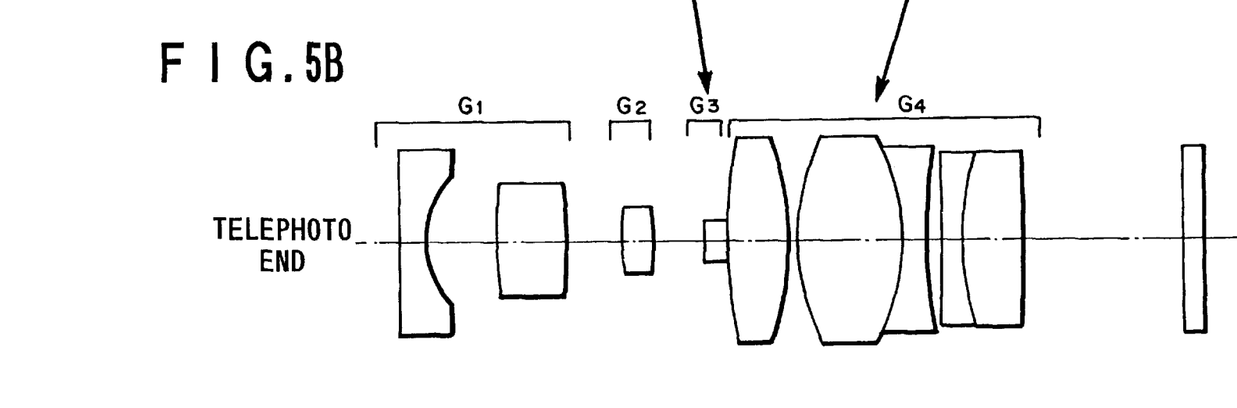
Figure 6A:
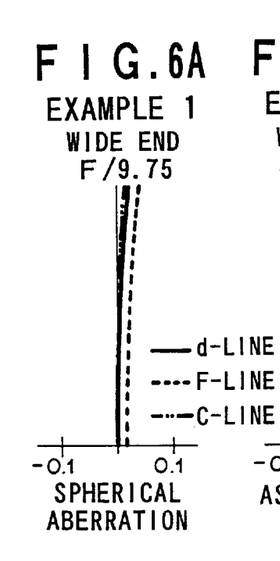
FIGS. 6A to 6H are aberration charts of the endoscope objective lens in accordance with Example 1 of the present invention.
Figures 6B, 6C:
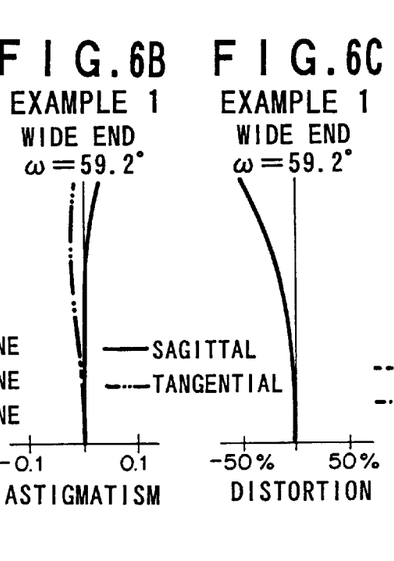
Figure 6D:
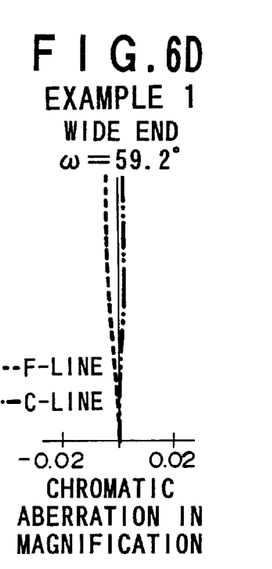
Figures 6E, 6F, 6G:
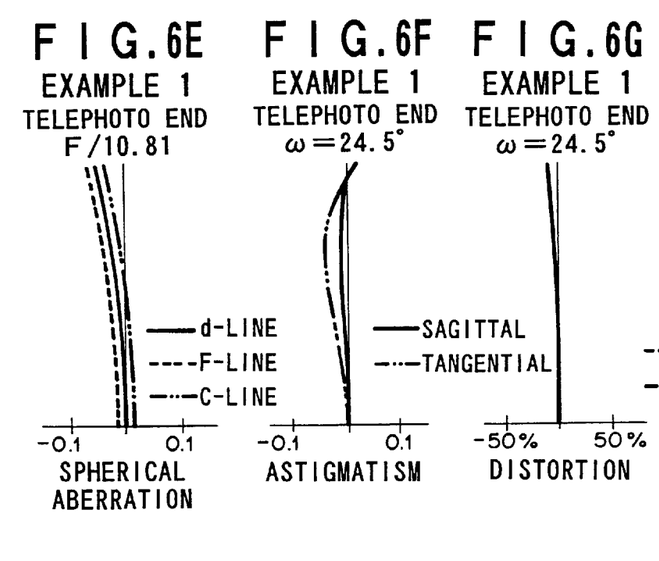
Figure 6H:
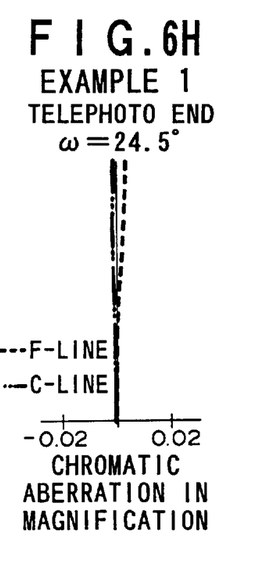
Figures 7A, 7B, 7C:
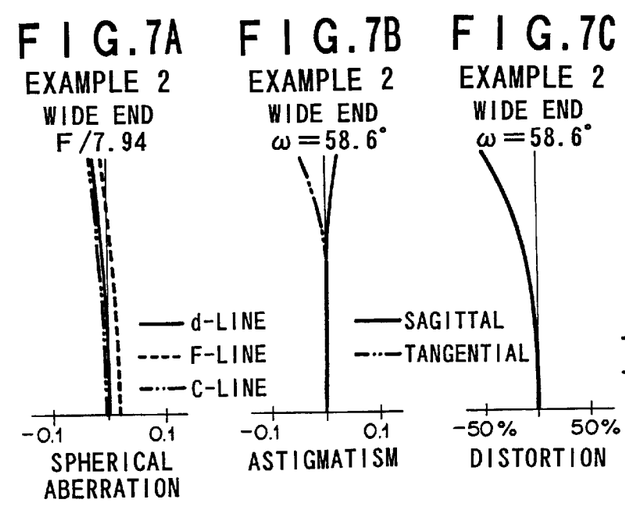
FIGS. 7A to 7H are aberration charts of the endoscope objective lens in accordance with Example 2 of the present invention.
Figure 7D:
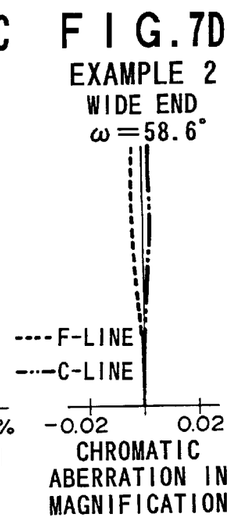
Figures 7E, 7F, 7G:
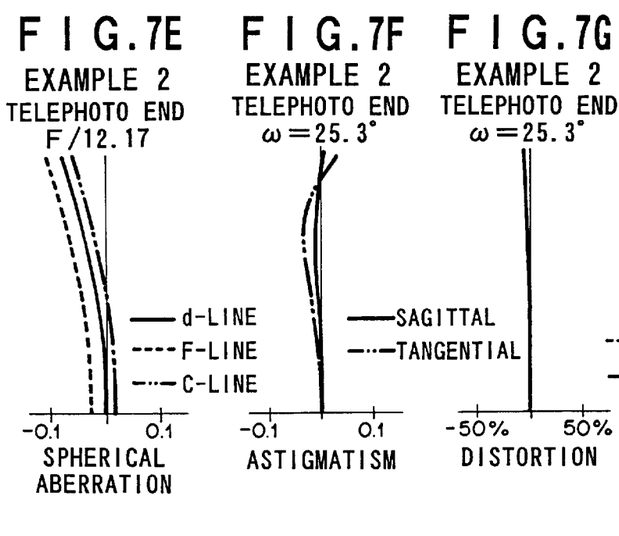
Figure 7H:
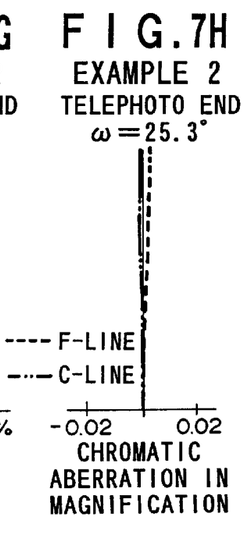
Figures 8A, 8B, 8C, 8D:
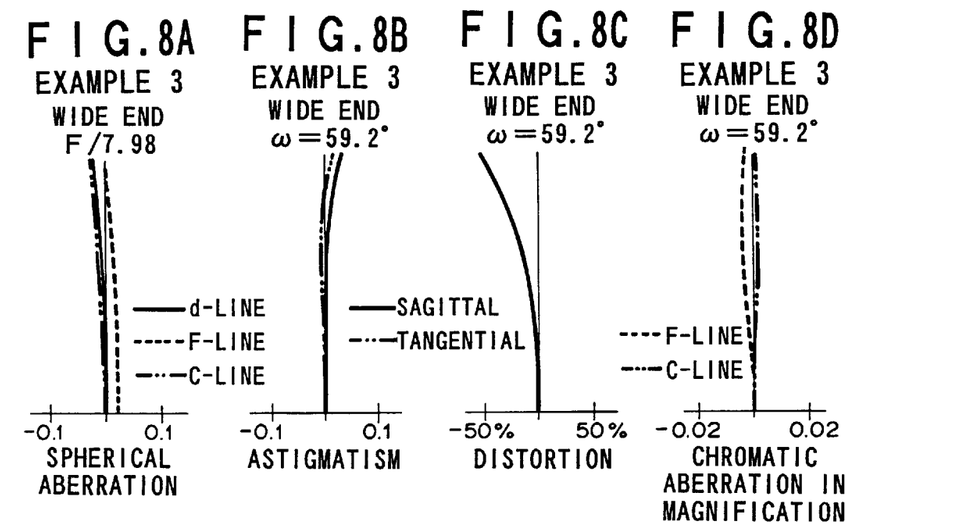
FIGS. 8A to 8H are aberration charts of the endoscope objective lens in accordance with Example 3 of the present invention.
Figures 8E, 8F, 8G, 8H:
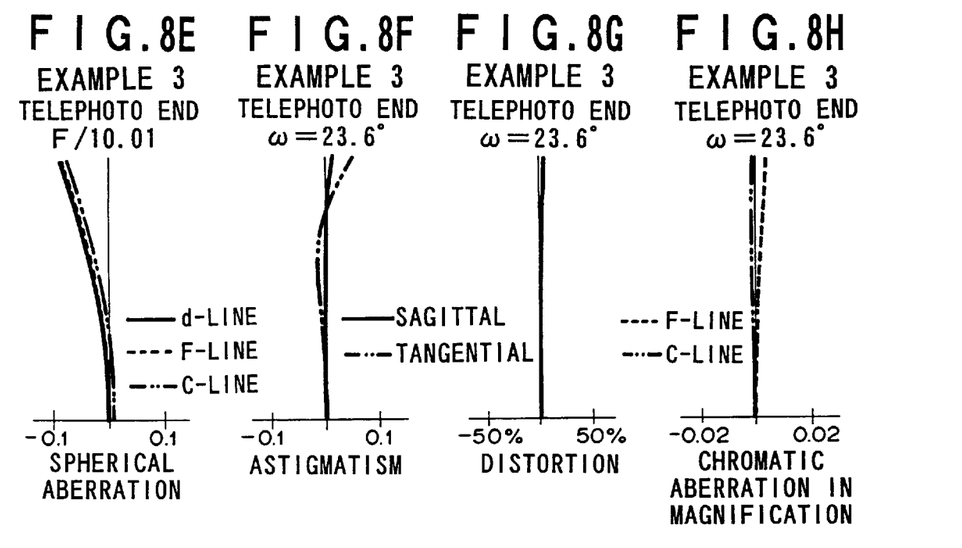
Figures 9A, 9B, 9C, 9D:
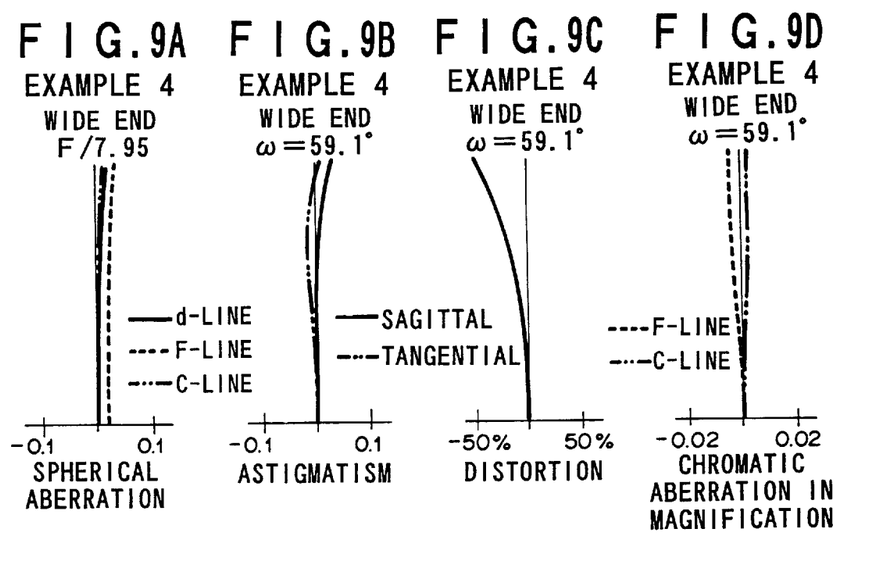
FIGS. 9A to 9H are aberration charts of the endoscope objective lens in accordance with Example 4 of the present invention.
Figures 9E, 9F, 9G, 9H:
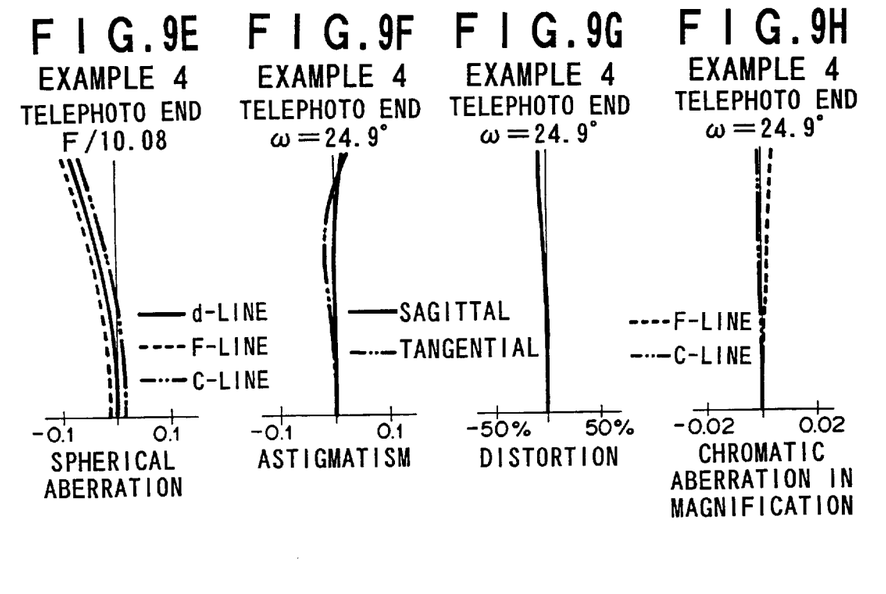
Figure 10A:
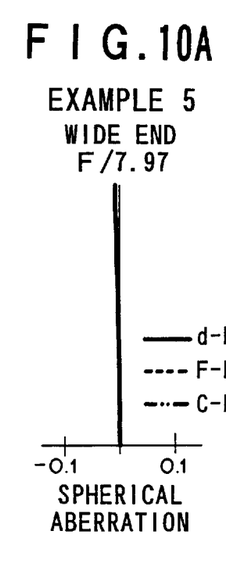
FIGS. 10A to 10H are aberration charts of the endoscope objective lens in accordance with Example 5 of the present invention.
Figure 10B:
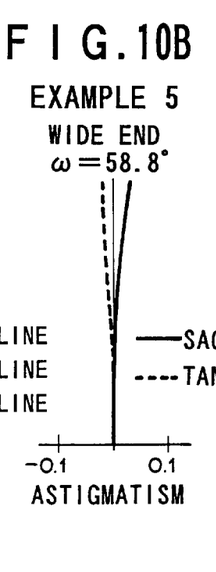
Figure 10C:
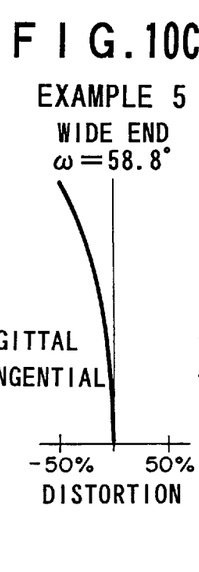
Figure 10D:
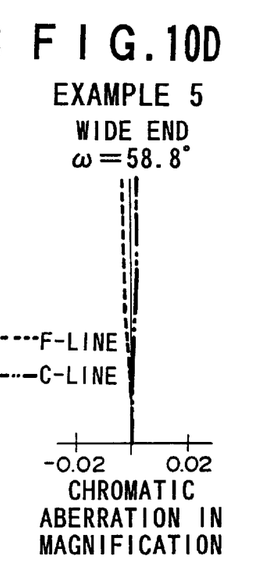
Figure 10E:
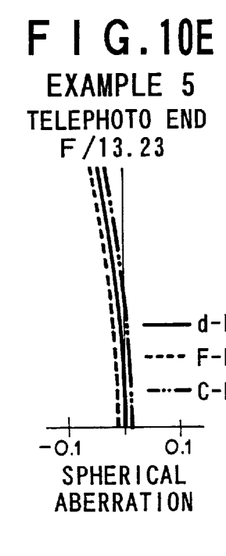
Figure 10F:
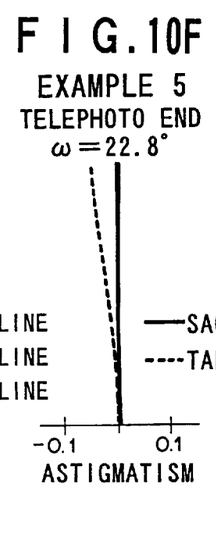
Figure 10G:
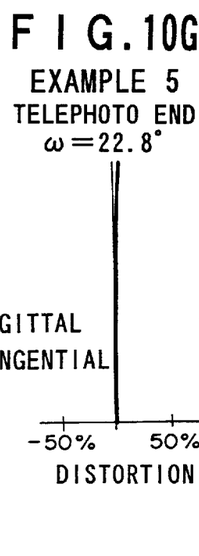
Figure 10H:
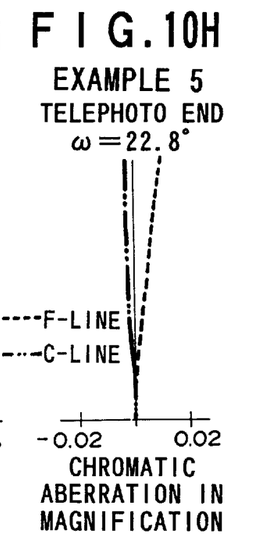

As shown in FIGS. 5A and 5B, this endoscope objective lens comprises, successively from the object side, a first lens group G, having a negative refracting power; a second lens group $G_2$ having a positive refracting power; a third lens group $G_3$, movable along the optical axis X, having a negative refracting power; and a fourth lens group $G_4$, movable along the optical axis X, having a positive refracting power.

As shown in FIGS. 5A and 5B, this endoscope objective lens is configured such that, from its normal viewing (wide)

state to close-up magnified (telephoto) state, the third lens group $G_3$ moves toward the image along the optical axis, while the fourth lens group $G_4$ moves toward the object along the optical axis at the same time, so as to make it possible to change magnification and carry out focusing.

Further, this objective lens is provided with a stop 1 and a CCD cover glass 2 as in the first embodiment; and, though not depicted, a CCD device or image guide fiber is disposed on the image side from the cover glass 2, so that image information is transmitted thereto. In FIGS. 5A and 5B, the stop 1 is disposed so as be in contact with the surface of third lens group $G_3$ closest to the object on the optical axis.

Also, this objective lens is configured so as to satisfy the following conditional expressions (1), (2), (4), (5), (7), and (8):

$$2.0 < \beta_{1T}/\beta_{1W} < 10.0 \qquad (1)$$

$$1.2 < f_T/f_W \qquad (2)$$

$$0.1 < |d_4|/f_4 < 0.8 \qquad (4)$$

$$0.4 < \beta_{3.4T}/\beta_{3.4W} < 2.5 \qquad (5)$$

$$-3.0 < f_3/f_W < -0.5 \qquad (7)$$

$$1.0 < f_4/f_W < 2.5 \qquad (8)$$

where $\beta_{1T}$ is the magnification of the first lens group $G_1$ at the telephoto end;

$\beta_{1W}$ is the magnification of the first lens group $G_1$ at the wide end;

$f_T$ is the focal length of the whole lens at the telephoto end;

$f_W$ is the focal length of the whole lens at the wide end;

$d_4$ is the moving distance of the fourth lens group $G_4$ from the wide end to the telephoto end;

$f_3$ is the focal length of the third lens group $G_3$;

$f_4$ is the focal length of the fourth lens group $G_4$;

$\beta_{3.4T}$ is the composite magnification of the third lens group $G_3$ and fourth lens group $G_4$ at the telephoto end; and $\beta_{3.4W}$ is the composite magnification of the third lens group $G_3$ and fourth lens group $G_4$ at the wide end.

In an endoscope objective lens having a configuration such as those of the first and second embodiments, the magnification in use of the objective lens can be changed arbitrarily while carrying out focusing not only in the normal viewing and close-up magnified states but also in their intermediate region, so as to yield a magnification suitable for the object to view and its circumstances of use.

As will be explained in the following, the changes in magnification in these embodiments are obtained by an interaction between those generated upon the change in object distance shown in conditional expression (1) and those generated by appropriately moving the two movable groups as shown in conditional expression (2).

Conditional expression (1) defines the telephoto/wide magnification ratio in the first lens group $G_1$. While $\beta_{1T}/\beta_{1W}=1$ in a zoom in general, conditional expression (1) indicates that the objective lens changes its magnification by utilizing the fact that the object to view looks greater when the object distance becomes shorter as the objective lens approaches the telephoto end when shifting from the wide state to the telephoto state. If the lower limit of this expression is not satisfied, then the magnification becomes insufficient on the telephoto side. If the upper limit of this expression is exceeded, then the object distance on the telephoto side becomes too short, whereby parts not sufficiently irradiated with illumination light from a light guide may be viewed.

Conditional expression (2) shows a value corresponding to the zoom ratio in zoom lenses in general. It indicates that two lens groups consisting of the second lens group $G_2$ and third lens group $G_3$ or the third lens group $G_3$ and fourth lens group $G_4$ are moved, so as to change the focal length, thereby changing the magnification. If the ratio in focal length between the telephoto and wide ends is smaller than the lower limit of this expression, then the object distance becomes too short when the same magnification is to be attained on the telephoto end, whereby parts not sufficiently irradiated with illumination light from a light guide may be viewed.

Since two lens groups are movable as shown in conditional expression (2), the magnification in use can be changed arbitrarily while carrying out focusing with respect to a single object distance.

For example, in the case where the object distance is fixed at 2.2032 in Example 1 which will be explained later, the positions of two movable groups, i.e., positions of the second lens group $G_2$ and third lens group $G_3$, can be set to the following types 1 and 2, both of which are in focus. Here, the lens group positions at this object distance are not restricted to these two types. In the process of moving from the wide end to telephoto end, combinations are possible at any position in their intermediate region, whereby the magnification in use can arbitrarily be changed in the intermediate region from the wide end to telephoto end according to the arrangement of two movable groups.

Type 1
variable value 1 (lens space between the first lens group $G_1$ and second lens group $G_2$): 0.8000
variable value 2 (lens space between the second lens group $G_2$ and third lens group $G_3$): 0.6615
variable value 3 (lens space between the third lens group $G_3$ and fourth lens group $G_4$): 0.3827

Type 2
variable value 1 (lens space between the first lens group $G_1$ and second lens group $G_2$): 0.2272
variable value 2 (lens space between the second lens group $G_2$ and third lens group $G_3$): 0.9343
variable value 3 (lens space between the third lens group $G_3$ and fourth lens group $G_4$): 0.6827

Here, the magnification is −0.4389 in type 1, and −0.4887 in type 2.

Conditional expressions (3) and (4) define the moving distance of the movable group having a positive refracting power, i.e., the moving distance of the second lens group $G_2$ or fourth lens group $G_4$. If the moving distance of these movable groups becomes shorter than the respective lower limits of their corresponding expressions, then the magnification may not fully be changed in the intermediate region. If their upper limits are exceeded, on the other hand, then the moving distance becomes so long that the whole length of the tip-constituting part of the endoscope becomes too long, which is unfavorable as the endoscope objective lens. In particular, if the upper limit of conditional expression (4) is exceeded, then the exit pupil may fluctuate in excess.

Conditional expression (5) is concerned with the exit pupil in the case where the stop 1 is disposed. On the outside of the upper and lower limit, the exit pupil may fluctuate in excess, whereby high-quality images may not be obtained.

Conditional expressions (6) to (8) define power distributions of movable groups. If the lower limit of conditional expression (6) or (8) is not satisfied, then the power of the movable group having a positive refracting power, i.e., the power of the second lens group $G_2$ or fourth lens group $G_4$, becomes so strong that aberration is hard to correct. Similarly, if the upper limit of conditional expression (7) is exceeded, then the power of the movable group having a negative refracting power, i.e., the power of the third lens $G_3$, becomes so strong that aberration is hard to correct. On the other hand, if the upper limit of conditional expression (6) or (8) is exceeded, then the moving distance of the movable group having a positive refracting power, i.e., the moving distance of the second lens group $G_2$ or fourth lens group $G_4$, becomes so long that the lens may lose its compactness. Similarly, if the lower limit of conditional expression (7) is exceeded, then the moving distance of the movable group having a negative refracting power, i.e., the moving distance of the third lens group $G_3$, becomes so long that the lens may lose its compactness.

EXAMPLES

In the following, Examples 1 to 5 of the present invention will be explained specifically.

Example 1

FIGS. 1A and 1B show the basic configuration of the endoscope objective lens in accordance with Example 1 at the wide and telephoto ends, respectively.

As explained as the first embodiment, the lens in accordance with Example 1 comprises, successively from the object side, a first lens group $G_1$ having a negative refracting power; a second lens group $G_2$, movable along the optical axis X, having a positive refracting power; a third lens group $G_3$, movable along the optical axis X, having a negative refracting power; and a fourth lens group $G_4$ having a positive refracting power.

In this Example, as shown in FIGS. 1A and 1B and the following Table 1, a stop 1 is disposed at a position identical to the object-side surface of the fifth lens $L_5$ on the optical axis. In FIGS. 1A and 1B and the following Table 1, the radius of curvature of the stop 1 is expressed as $R_8$.

The upper part of Table 1 shows the radius of curvature R of each lens surface, axial surface space of each lens (center thickness of each lens and air space between each pair of neighboring lenses) D, and refractive index N and Abbe number v of each lens at d-line in Example 1. In Table 1 and its subsequent Tables 2 to 5, the radius of curvature R and axial surface space D are values normalized with the focal length at the wide end being taken as 1.0, and the numbers referring to the symbols successively increase from the object side.

Also, the lower part of Table 1 shows values of object distance (normalized as with the axial surface space D; also in the following Tables 2 to 5), magnification, and variable group distances 1 to 3 of axial surface distance D at the wide and telephoto ends in Example 1.

Example 2

Figure 2A:
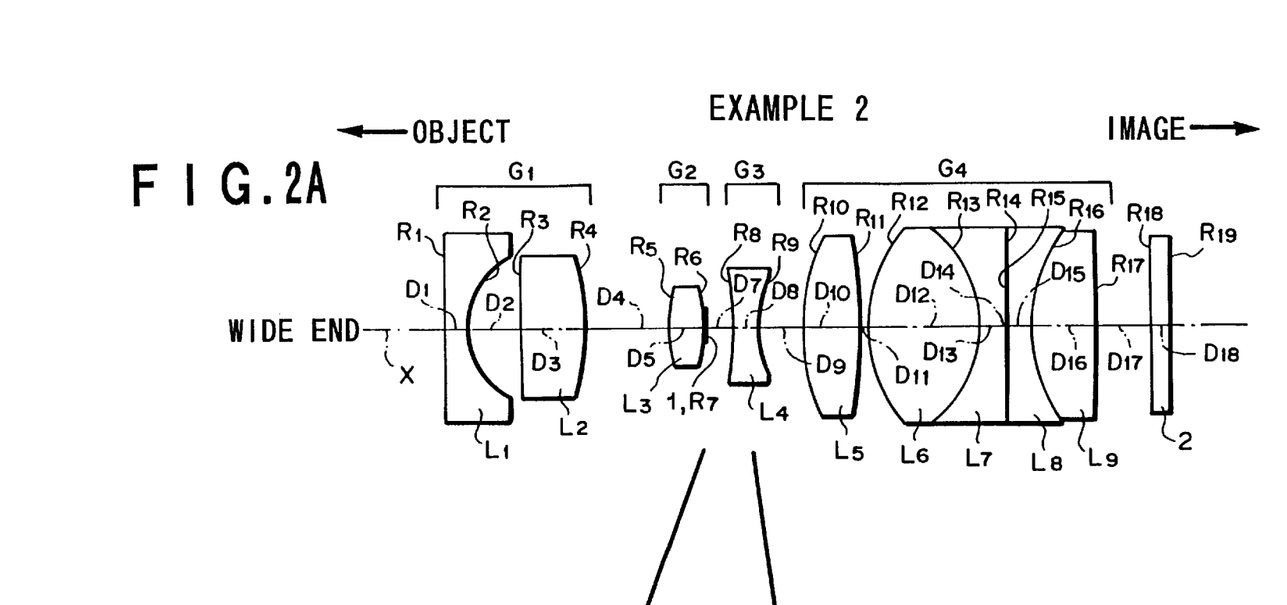
FIGS. 2A and 2B are views showing the configuration of the endoscope objective lens in accordance with Example 2 of the present invention.
Figure 2B:
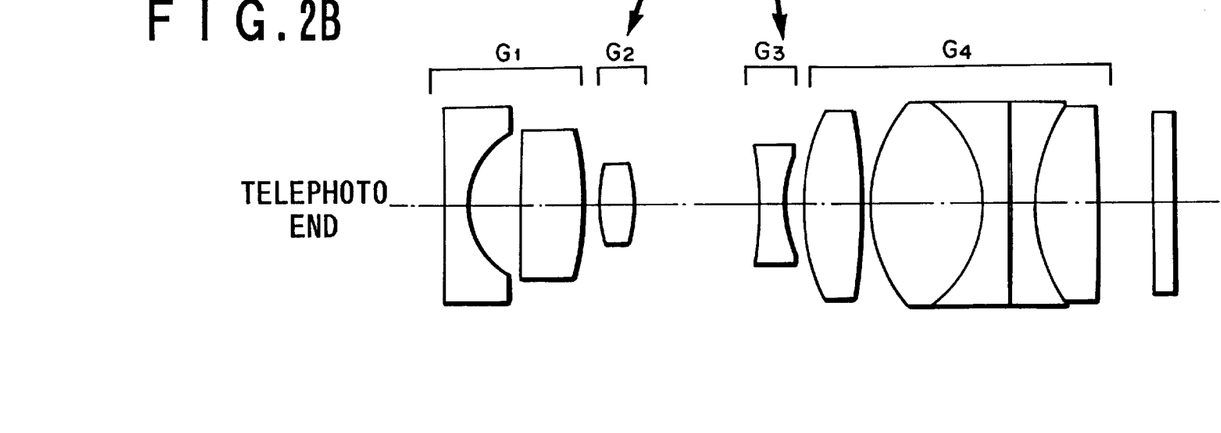

FIGS. 2A and 2B show the basic configuration of the endoscope objective lens in accordance with Example 2 at the wide and telephoto ends, respectively.

The lens in accordance with Example 2 has a configuration substantially the same as that of Example 1.

In this Example, as shown in FIGS. 2A and 2B and the following Table 2, the stop 1 is disposed at a position identical to the image-side surface of the third lens $L_3$ on the optical axis. In FIGS. 2A and 2B and the following Table 2, the radius of curvature of the stop 1 is expressed as $R_7$.

The upper part of Table 2 shows the radius of curvature R of each lens surface, axial surface space of each lens (center thickness of each lens and air space between each pair of neighboring lenses) D, and refractive index N and Abbe number v of each lens at d-line in Example 2.

Also, the lower part of Table 2 shows values of object distance, magnification, and variable group distances 1 to 3 of axial surface distance D at the wide and telephoto ends in Example 2.

Example 3

Figure 3A:
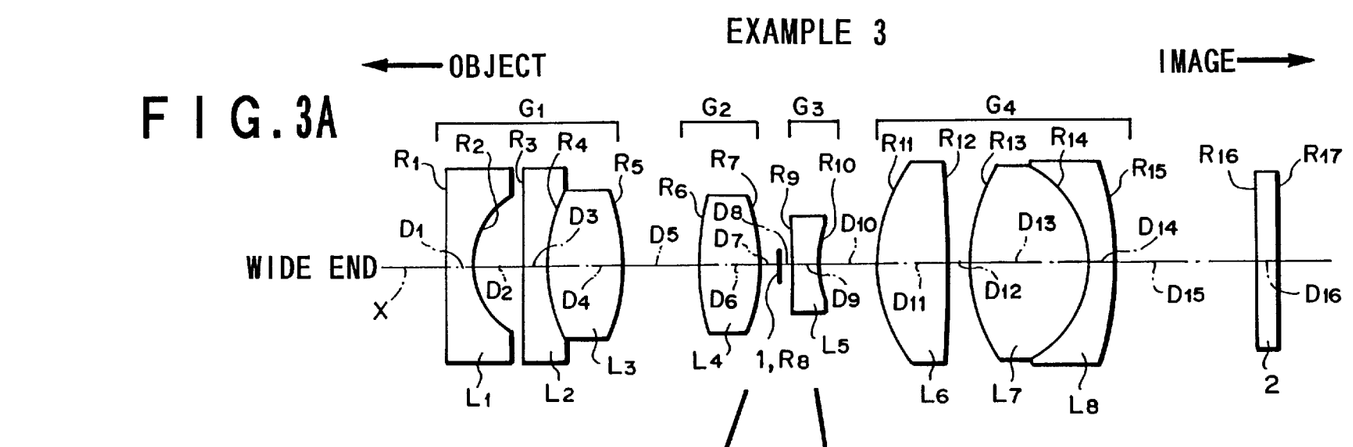
FIGS. 3A and 3B are views showing the configuration of the endoscope objective lens in accordance with Example 3 of the present invention.
Figure 3B:
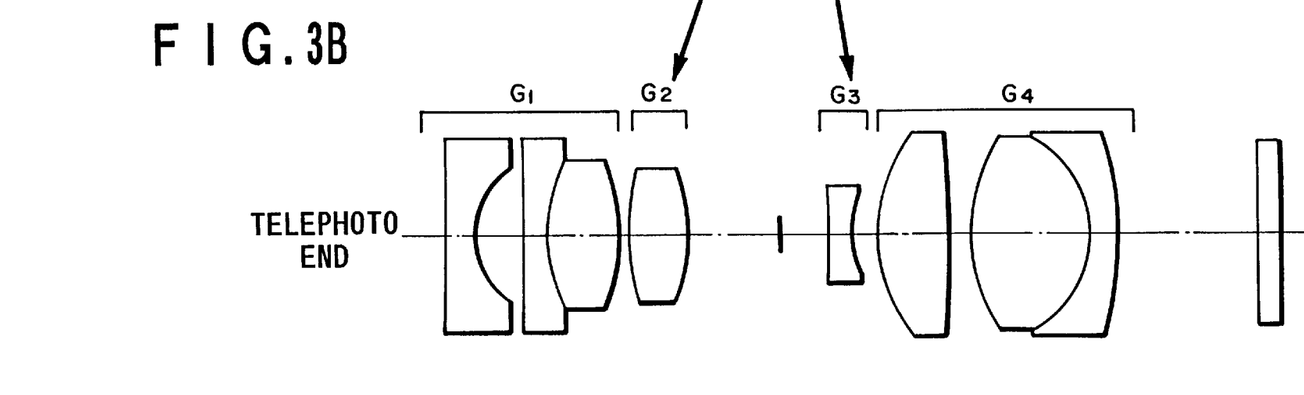

FIGS. 3A and 3B show the basic configuration of the endoscope objective lens in accordance with Example 3 at the wide and telephoto ends, respectively.

The lens in accordance with Example 3 has a configuration substantially the same as that of Example 1.

In this Example, as shown in FIGS. 3A and 3B and the following Table 3, the stop 1 is disposed between the second lens group $G_2$ and third lens group $G_3$. In FIGS. 3A and 3B and the following Table 3, the radius of curvature of the stop 1 is expressed as $R_8$.

The upper part of Table 3 shows the radius of curvature R of each lens surface, axial surface space of each lens (center thickness of each lens and air space between each pair of neighboring lenses) D, and refractive index N and Abbe number v of each lens at d-line in Example 3.

Also, the lower part of Table 3 shows values of object distance (normalized as with the axial surface space D), magnification, and variable group distances 1 to 4 of axial surface distance D at the wide and telephoto ends in Example 3.

Example 4

Figure 4A:
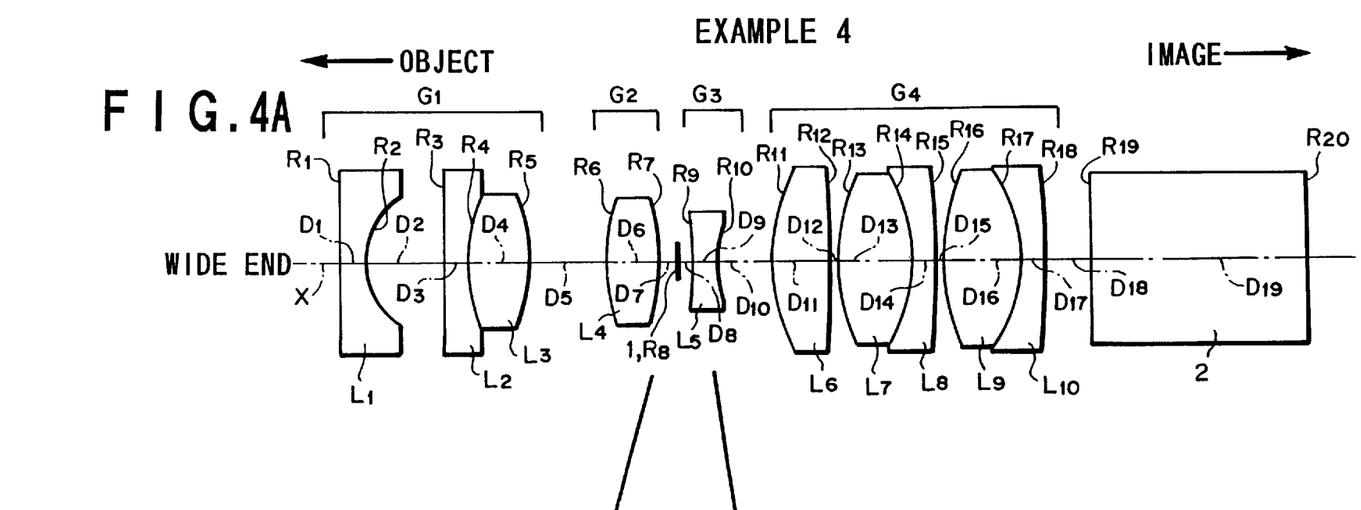
FIGS. 4A and 4B are views showing the configuration of the endoscope objective lens in accordance with Example 4 of the present invention.
Figure 4B:
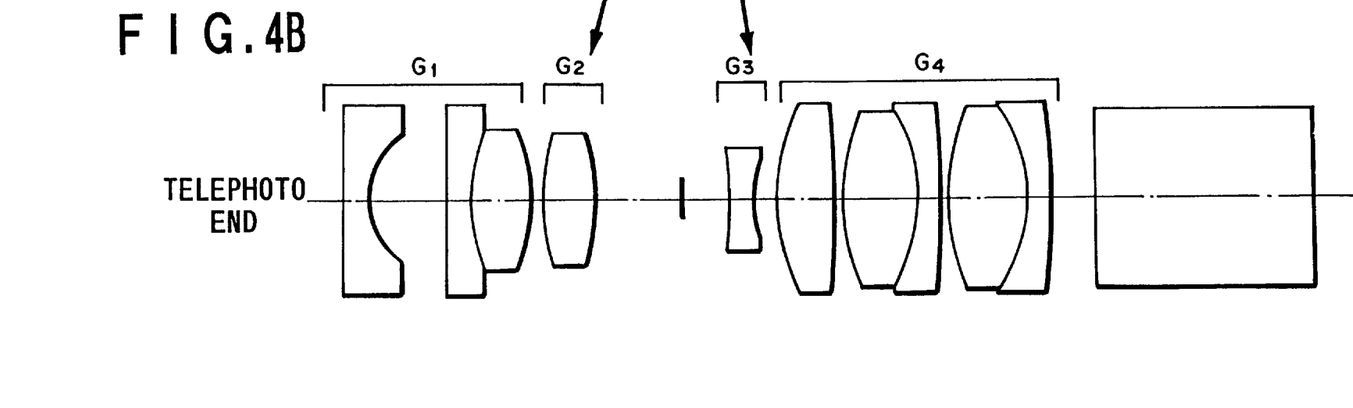

FIGS. 4A and 4B show the basic configuration of the endoscope objective lens in accordance with Example 4 at the wide and telephoto ends, respectively.

The lens in accordance with Example 4 has a configuration substantially the same as that of Example 3. In FIGS. 4A and 4B and the following Table 4, the radius of curvature of the stop 1 is expressed as $R_8$.

The upper part of Table 4 shows the radius of curvature R of each lens surface, axial surface space of each lens (center thickness of each lens and air space between each pair of neighboring lenses) D, and refractive index N and Abbe number v of each lens at d-line in Example 4.

Also, the lower part of Table 4 shows values of object distance, magnification, and variable group distances 1 to 4 of axial surface distance D at the wide and telephoto ends in Example 4.

Example 5

FIGS. 5A and 5B show the basic configuration of the endoscope objective lens in accordance with Example 5 at the wide and telephoto ends, respectively.

As explained as the second embodiment, the lens in accordance with Example 5 comprises, successively from the object side, a first lens group $G_1$ having a negative refracting power; a second lens group $G_2$ having a positive refracting power; a third lens group $G_3$, movable along the optical axis X, having a negative refracting power; and a fourth lens group $G_4$, movable along the optical axis X, having a positive refracting power.

In this Example, as shown in FIGS. 5A and 5B and the following Table 5, a stop 1 is disposed at a position identical to the object-side surface of the fourth lens $L_4$ on the optical axis. In FIGS. 5A and 5B and the following Table 5, the radius of curvature of the stop 1 is expressed as $R_7$.

The upper part of Table 5 shows the radius of curvature R of each lens surface, axial surface space of each lens (center thickness of each lens and air space between each pair of neighboring lenses) D, and refractive index N and Abbe number ν of each lens at d-line in Example 5.

Also, the lower part of Table 5 shows values of object distance, magnification, and variable group distances 1 to 3 of axial surface distance D at the wide and telephoto ends in Example 5.

The following Table 6 shows the values corresponding to conditional expressions (1) to (8) in Examples 1 to 5. Examples 1 to 5 satisfy all of their corresponding conditional expressions (1) to (8).

FIGS. 6A to 10H show various kinds of aberration (spherical aberration, astigmatism, distortion, and chromatic aberration in magnification) of Examples 1 to 5 at their wide and telephoto ends. In these aberration charts, ω indicates the half angle of view. As shown in FIGS. 6A to 10H, Examples 1 to 5 can make each of the above-mentioned kinds of aberration favorable.

Without being restricted to those of the above-mentioned Examples, the endoscope objective lens of the present invention can be modified in various manners. For example, the radius of curvature and lens space (lens thickness D) of each lens can be changed as appropriate.

Also, aspheric surfaces, GRIN lenses, and diffraction optical elements may be used in addition to or in place of elements in the endoscope objective lens in accordance with the above-mentioned embodiments, so as to correct chromatic aberration and other kinds of aberration.

As explained in the foregoing, the endoscope objective lens in accordance with the present invention can yield a compact endoscope objective lens in which various kinds of aberration are favorably corrected, and the magnification in use of the objective lens can arbitrarily be changed while carrying out focusing not only in the normal viewing (wide) state and close-up magnified viewing (telephoto) state but also in their intermediate region by moving predetermined two lens groups in four lens groups.

TABLE 1

EXAMPLE 1

| Surface | R | D | $N_d$ | $v_d$ |
|---|---|---|---|---|
| 1 | ∞ | 0.2352 | 1.8830 | 40.9 |
| 2 | 0.7090 | 0.7392 | | |
| 3 | ∞ | 0.2352 | 1.8010 | 35.0 |
| 4 | 1.3406 | 0.7930 | 1.4875 | 70.2 |
| 5 | −1.3406 | (variable 1) | | |
| 6 | 1.9743 | 0.6720 | 1.4875 | 70.2 |
| 7 | −1.9743 | (variable 2) | | |
| 8 | ∞(stop) | 0.0000 | | |
| 9 | ∞ | 0.2016 | 1.7550 | 52.3 |
| 10 | 1.2775 | (variable 3) | | |
| 11 | 1.5301 | 0.5846 | 1.6200 | 36.3 |
| 12 | ∞ | 0.0672 | | |
| 13 | 3.1960 | 0.7258 | 1.4875 | 70.2 |
| 14 | −0.9583 | 0.2352 | 1.7859 | 44.2 |
| 15 | ∞ | 0.0672 | | |
| 16 | 1.5570 | 0.7795 | 1.4875 | 70.2 |
| 17 | −1.5570 | 0.2352 | 1.8467 | 23.8 |
| 18 | −7.0392 | 0.6030 | | |
| 19 | ∞ | 2.0832 | 1.5163 | 64.1 |
| 20 | ∞ | | | |

| | Wide end | Telephoto end |
|---|---|---|
| Object distance | 10.4159 | 1.3910 |
| Magnification | −0.0910 | −0.8741 |
| Variable 1 | 0.8375 | 0.1382 |
| Variable 2 | 0.2240 | 1.4271 |
| Variable 3 | 0.7827 | 0.2789 |

TABLE 2

EXAMPLE 2

| Surface | R | D | $N_d$ | $v_d$ |
|---|---|---|---|---|
| 1 | ∞ | 0.2476 | 1.8830 | 40.9 |
| 2 | 0.7273 | 0.4714 | | |
| 3 | 22.8131 | 0.6022 | 1.7292 | 54.7 |
| 4 | −2.2319 | (variable 1) | | |
| 5 | 1.5723 | 0.3346 | 1.4875 | 70.2 |
| 6 | −1.2488 | 0.0 | | |
| 7 | ∞(stop) | (variable 2) | | |
| 8 | −3.8154 | 0.2342 | 1.8010 | 35.0 |
| 9 | 1.1588 | (variablee 3) | | |
| 10 | 1.8406 | 0.5687 | 1.7130 | 53.9 |
| 11 | −4.4132 | 0.0678 | | |
| 12 | 1.3614 | 1.0773 | 1.5163 | 64.1 |
| 13 | −1.0451 | 0.2342 | 1.8467 | 23.8 |
| 14 | 14.9304 | 0.0243 | | |
| 15 | ∞ | 0.2409 | 1.7130 | 53.9 |
| 16 | 1.4891 | 0.6022 | 1.7847 | 26.3 |
| 17 | −18.7405 | 0.5065 | | |
| 18 | ∞ | 0.2007 | 1.5163 | 64.1 |
| 19 | ∞ | | | |

| | Wide end | Telephoto end |
|---|---|---|
| Object distance | 8.6983 | 1.6727 |
| Magnification | −0.1091 | −0.8065 |
| Variable 1 | 0.7689 | 0.1137 |
| Variable 2 | 0.2576 | 1.1375 |
| Variable 3 | 0.4109 | 0.1862 |

TABLE 3

EXAMPLE 3

| Surface | R | D | $N_d$ | $v_d$ |
|---|---|---|---|---|
| 1 | ∞ | 0.2704 | 1.8830 | 40.9 |
| 2 | 0.7039 | 0.4557 | | |
| 3 | ∞ | 0.2366 | 1.7847 | 25.7 |
| 4 | 1.4303 | 0.6827 | 1.6204 | 60.3 |
| 5 | −1.7002 | (variable 1) | | |

TABLE 3-continued

EXAMPLE 3

| | | | | |
|---|---|---|---|---|
| 6 | 2.1876 | 0.5408 | 1.5891 | 61.1 |
| 7 | −1.6275 | (variable 2) | | |
| 8 | ∞(stop) | (variable 3) | | |
| 9 | −9.6848 | 0.2366 | 1.7550 | 52.3 |
| 10 | 1.0736 | (variable 4) | | |
| 11 | 1.4196 | 0.6760 | 1.5163 | 64.1 |
| 12 | −12.5825 | 0.2102 | | |
| 13 | 1.5114 | 1.1356 | 1.4875 | 70.2 |
| 14 | −0.9768 | 0.2366 | 1.8467 | 23.8 |
| 15 | −3.2433 | 1.3135 | | |
| 16 | ∞ | 0.2028 | 1.5163 | 64.1 |
| 17 | ∞ | | | |

| | Wide end | Telephoto end |
|---|---|---|
| Object distance | 10.4774 | 1.4871 |
| Magnification | −0.0905 | −0.8500 |
| Variable 1 | 0.7137 | 0.0663 |
| Variable 2 | 0.2009 | 0.8483 |
| Variable 3 | 0.1233 | 0.4532 |
| Variable 4 | 0.5576 | 0.2276 |

TABLE 4

EXAMPLE 4

| Surface | R | D | $N_d$ | $v_d$ |
|---|---|---|---|---|
| 1 | ∞ | 0.2375 | 1.8830 | 40.9 |
| 2 | 0.7207 | 0.7438 | | |
| 3 | ∞ | 0.2375 | 1.7847 | 26.3 |
| 4 | 1.6570 | 0.5903 | 1.5225 | 59.8 |
| 5 | −1.5012 | (variable 1) | | |
| 6 | 1.9372 | 0.5021 | 1.5725 | 57.7 |
| 7 | −1.9588 | (variable 2) | | |
| 8 | ∞(stop) | (variable 3) | | |
| 9 | −4.0632 | 0.2375 | 1.7550 | 52.3 |
| 10 | 1.1789 | (variable 4) | | |
| 11 | 1.9154 | 0.5632 | 1.6200 | 36.3 |
| 12 | −9.1872 | 0.0679 | | |
| 13 | 2.0103 | 0.7192 | 1.4875 | 70.2 |
| 14 | −1.5811 | 0.2375 | 1.8340 | 37.2 |
| 15 | −11.5561 | 0.0679 | | |
| 16 | 2.1307 | 0.7531 | 1.5400 | 59.5 |
| 17 | −1.3981 | 0.2375 | 1.8467 | 23.8 |
| 18 | −8.7698 | 0.4339 | | |
| 19 | ∞ | 2.1033 | 1.5163 | 64.1 |
| 20 | ∞ | | | |

TABLE 4-continued

EXAMPLE 4

| | Wide end | Telephoto end |
|---|---|---|
| Object distance | 10.5167 | 1.4248 |
| Magnification | −0.0901 | −0.8667 |
| Variable 1 | 0.7308 | 0.0970 |
| Variable 2 | 0.2029 | 0.8366 |
| Variable 3 | 0.1250 | 0.4419 |
| Variable 4 | 0.5463 | 0.2295 |

TABLE 5

EXAMPLE 5

| Surface | R | D | $N_d$ | $v_d$ |
|---|---|---|---|---|
| 1 | ∞ | 0.2567 | 1.8830 | 40.9 |
| 2 | 0.8036 | 0.6125 | | |
| 3 | 4.3724 | 0.6383 | 1.8052 | 25.4 |
| 4 | −5.4262 | 0.5047 | | |
| 5 | 2.1172 | 0.3102 | 1.7337 | 54.0 |
| 6 | −2.4221 | (variable 1) | | |
| 7 | ∞(stop) | 0.0 | | |
| 8 | −5.1830 | 0.2139 | 1.7843 | 26.8 |
| 9 | 1.4608 | (variable 2) | | |
| 10 | 4.2995 | 0.5669 | 1.7900 | 48.3 |
| 11 | −2.7028 | 0.0687 | | |
| 12 | 1.9142 | 0.9840 | 1.6173 | 60.0 |
| 13 | −1.8804 | 0.2139 | 1.7985 | 27.0 |
| 14 | 4.4384 | 0.1362 | | |
| 15 | −29.9828 | 0.1925 | 1.8830 | 40.8 |
| 16 | 2.3651 | 0.5776 | 1.6237 | 47.0 |
| 17 | −24.7677 | (variable 3) | | |
| 18 | ∞ | 0.2059 | 1.5163 | 64.1 |
| 19 | ∞ | | | |

| | Wide end | Telephoto end |
|---|---|---|
| Object distance | 8.9224 | 1.7157 |
| Magnification | −0.1054 | −0.7979 |
| Variable 1 | 0.0584 | 0.4539 |
| Variable 2 | 1.1039 | 0.0075 |
| Variable 3 | 0.7745 | 1.4752 |

TABLE 6

| | Example 1 | Example 2 | Example 3 | Example 4 | Example 5 |
|---|---|---|---|---|---|
| Conditional expression (1) $\beta_{1T}/\beta_{1W}$ | 4.563 | 3.201 | 4.239 | 4.438 | 3.152 |
| Conditional expression (2) $f_T/f_W$ | 1.431 | 1.353 | 1.466 | 1.463 | 1.355 |
| Conditional expression (3) $|d_2|/f_2$ | 0.326 | 0.441 | 0.387 | 0.355 | — |
| Conditional expression (4) $|d_4|/f_4$ | — | — | — | — | 0.428 |
| Conditional expression (5) $\beta_{3-4T}/\beta_{3-4W}$ | 1.214 | 1.135 | 1.154 | 1.223 | 1.629 |
| Conditional expression (6) $f_2/f_W$ | 2.145 | 1.485 | 1.672 | 1.785 | — |
| Conditional expression (7) $f_3/f_W$ | −1.692 | −1.087 | −1.268 | −1.187 | −1.433 |
| Conditional expression (8) $f_4/f_W$ | — | — | — | — | 1.637 |

What is claimed is:

1. An endoscope objective lens comprising, successively from an object side, a first lens group having a negative refracting power, a second lens group having a positive refracting power, a third lens group having a negative refracting power, and a fourth lens group having a positive refracting power; wherein two lens groups consisting of said third lens group and one of said second and fourth lens groups are moved along an optical axis so as to change magnification and carry out focusing; said endoscope objective lens further satisfying the following conditional expressions (1) and (2):

$$2.0 < \beta_{1T}/\beta 1W < 10.0 \quad (1)$$

$$1.2 < f_T/f_W \quad (2)$$

where $\beta_{1T}$ is the magnification of the first lens group at the telephoto end;

$\beta_{1W}$ is the magnification of the first lens group at the wide end;

$f_T$ is the focal length of the whole lens at the telephoto end; and $f_W$ is the focal length of the whole lens at the wide end.

2. An endoscope objective lens according to claim 1, wherein two lens groups consisting of said second and third lens groups are moved along the optical axis so as to change magnification and carry out focusing; said endoscope objective lens further satisfying the following conditional expression (3):

$$0.1 < |d_2|/f_2 < 1.0 \quad (3)$$

where $d_2$ is the moving distance of the second lens group from the wide end to the telephoto end; and $f_2$ is the focal length of the second lens group.

3. An endoscope objective lens according to claim 2, wherein a stop is disposed between said second and third lens groups; said endoscope objective lens further satisfying the following conditional expression (5):

$$0.4 < \beta_{3.4T}/\beta_{3.4W} < 2.5 \quad (5)$$

where $\beta_{3.4T}$ is the composite magnification of the third and fourth lens groups at the telephoto end; and $\beta_{3.4W}$ is the composite magnification of the third and fourth lens groups at the wide end.

4. An endoscope objective lens according to claim 3, further satisfying the following conditional expressions (6) and (7):

$$0.7 < f_2/f_W < 4.0 \quad (6)$$

$$-3.0 < f_3/f_W < -0.5 \quad (7)$$

where $f_2$ is the focal length of the second lens group;

$f_3$ is the focal length of the third lens group; and $f_W$ is the focal length of the whole lens at the wide end.

5. An endoscope objective lens according to claim 2, further satisfying the following conditional expressions (6) and (7):

$$0.7 < f_2/f_W < 4.0 \quad (6)$$

$$3.0 < f_3/f_W < -0.5 \quad (7)$$

where $f_2$ is the focal length of the second lens group;

$f_3$ is the focal length of the third lens group; and $f_W$ is the focal length of the whole lens at the wide end.

6. An endoscope objective lens according to claim 1, wherein two lens groups consisting of said third and fourth lens groups are moved along the optical axis so as to change magnification and carry out focusing; said endoscope objective lens further satisfying the following conditional expression (4):

$$0.1 < |d_4|/f_4 < 0.8 \quad (4)$$

where $d_4$ is the moving distance of the fourth lens group from the wide end to the telephoto end; and $f_4$ is the focal length of the fourth lens group.

7. An endoscope objective lens according to claim 6, wherein a stop is disposed between said second and third lens groups; said endoscope objective lens further satisfying the following conditional expression (5):

$$0.4 < \beta_{3.4T}/\beta_{3.4W} < 2.5 \quad (5)$$

where $\beta_{3.4T}$ is the composite magnification of the third and fourth lens groups at the telephoto end; and $\beta_{3.4W}$ is the composite magnification of the third and fourth lens groups at the wide end.

8. An endoscope objective lens according to claim 6, further satisfying the following conditional expressions $$-3.0 < f_3/f_W < -0.5 \quad (7)$$

$$1.0 < f_4/f_W < 2.5 \quad (8)$$

where $f_3$ is the focal length of the third lens group;

$f_4$ is the focal length of the fourth lens group; and $f_W$ is the focal length of the whole lens at the wide end.

9. An endoscope objective lens according to claim 7, further satisfying the following conditional expressions $$-3.0 < f_3/f_W < -0.5 \quad (7)$$

$$1.0 < f_4/f_W < 2.5 \quad (8)$$

where $f_3$ is the focal length of the third lens group;

$f_4$ is the focal length of the fourth lens group; and $f_W$ is the focal length of the whole lens at the wide end.

* * * * *

UNITED STATES PATENT AND TRADEMARK OFFICE
CERTIFICATE OF CORRECTION

PATENT NO. : 6,353,504
DATED : March 5, 2002
INVENTOR(S) : Chikara Yamamoto

It is certified that error appears in the above-identified patent and that said Letters Patent is hereby corrected as shown below:

Title page,
ABSTRACT, line 9, delete "$2.0<\beta_{1T}/\beta_{1W<10.0}$" and substitute therefore -- $2.0<\beta_{1T}/\beta_{1W}<10.0$ --

Column 13,
Line 14, delete "$2.0<\beta_{1T}/\beta 1W<10.0$" and substitute therefore -- $2.0<\beta_{1T}/\beta_{1W}<10.0$ --

Column 14,
Line 8, delete "$3.0<f_3/f_W<-0.5$" and substitute therefore -- $-3.0<f_3/f_W<-0.5$ --

Signed and Sealed this

Twenty-first Day of May, 2002

Attest:

Attesting Officer

JAMES E. ROGAN
*Director of the United States Patent and Trademark Office*